US 8,874,343 B2

(12) United States Patent
Anderson et al.

(10) Patent No.: US 8,874,343 B2
(45) Date of Patent: Oct. 28, 2014

(54) ADJUSTABLE BRAKE BOOSTER

(75) Inventors: Chris Anderson, Paris (FR); Bastien Cagnac, Chantilly (FR); Raynald Sprocq, Esbly (FR)

(73) Assignee: Robert Bosch GmbH, Stuttgart (DE)

( * ) Notice: Subject to any disclaimer, the term of this patent is extended or adjusted under 35 U.S.C. 154(b) by 172 days.

(21) Appl. No.: 13/054,708

(22) PCT Filed: Jul. 10, 2009

(86) PCT No.: PCT/EP2009/058809
§ 371 (c)(1),
(2), (4) Date: Jan. 18, 2011

(87) PCT Pub. No.: WO2010/006996
PCT Pub. Date: Jan. 21, 2010

(65) Prior Publication Data
US 2011/0178687 A1    Jul. 21, 2011

(30) Foreign Application Priority Data
Jul. 17, 2008  (FR) ..................................... 08 04079

(51) Int. Cl.
G06F 19/00      (2011.01)
B60T 13/74      (2006.01)
(52) U.S. Cl.
CPC .................................. *B60T 13/745* (2013.01)
USPC ........................ 701/70; 303/114.3; 303/115.2
(58) Field of Classification Search
CPC ..... B60T 13/10; B60T 13/102; B60T 13/145; B60T 13/741; B60T 13/745; B60T 13/746; B60T 7/042; B60T 8/441
USPC ........ 60/545; 303/113.3, 114.1, 114.3, 115.2, 303/3; 701/70, 78
See application file for complete search history.

(56) References Cited

U.S. PATENT DOCUMENTS 5,172,964 A    12/1992   Levrai et al.
5,558,409 A     9/1996   Walenty et al.
(Continued)

FOREIGN PATENT DOCUMENTS

FR          2727370 A1    5/1996
FR          2860474 A1    4/2005
(Continued)

OTHER PUBLICATIONS

PCT/EP2009/058809 International Search Report and Written Opinion (dated Aug. 24, 2009).

*Primary Examiner* — Thomas Tarcza
*Assistant Examiner* — Kevin Myhre
(74) *Attorney, Agent, or Firm* — Michael Best & Friedrich LLP

(57) ABSTRACT

The present invention relates mainly to a brake booster that is adjustable, notably in terms of the value of the jump. Advantageously, according to the invention, the target value for equilibrium of operation of the booster actuator is altered. A target value of a signal delivered by a position sensor is defined either by programming the electronic control unit or by selecting a coefficient in a program as a function of the braking characteristic or characteristics that it is desired to implement. Once the setpoint value has been determined, the electronic control unit commands the actuator using a setpoint value so that the actuator permanently and dynamically works toward achieving the previously defined and/or selected target value. The setpoint may be calculated as a function of torque, force, position or some other parameter.

12 Claims, 10 Drawing Sheets

(56) References Cited

U.S. PATENT DOCUMENTS

| | | |
|---|---|---|
| 7,267,412 B2 | 9/2007 | Gronau et al. |
| 7,367,187 B2 | 5/2008 | Ikeda et al. |
| 2007/0199436 A1* | 8/2007 | Ikeda et al. ............ 91/376 R |
| 2008/0236971 A1* | 10/2008 | Suzuki et al. ............ 188/358 |
| 2009/0115242 A1* | 5/2009 | Ohtani et al. ............ 303/3 |

FOREIGN PATENT DOCUMENTS

| | | |
|---|---|---|
| WO | 2007/080106 A1 | 7/2007 |
| WO | 2007/080158 A1 | 7/2007 |

\* cited by examiner

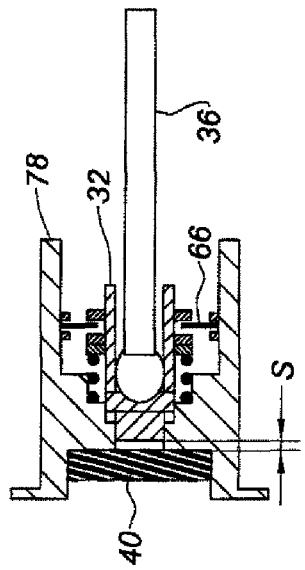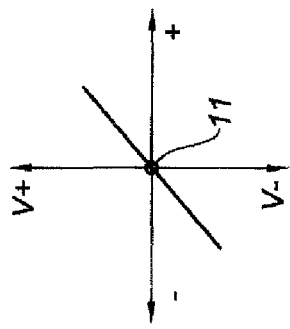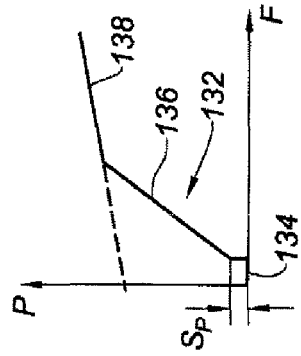
Fig. 12a  Fig. 12b  Fig. 12c
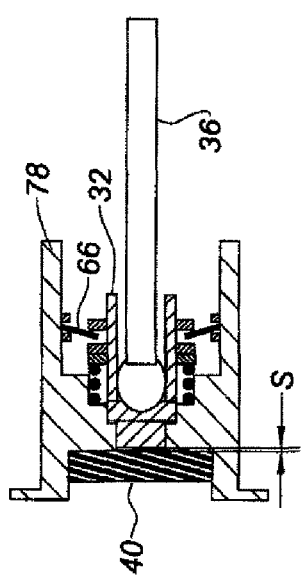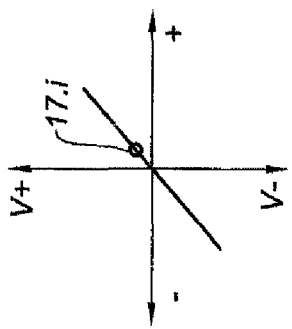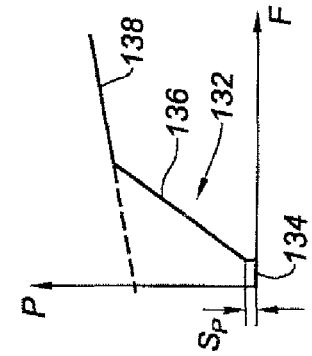
Fig. 13a  Fig. 13b  Fig. 13c

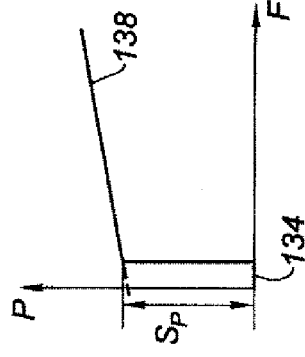
Fig. 14c
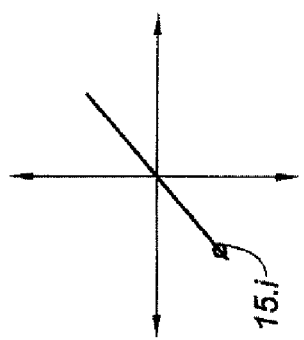
Fig. 14b
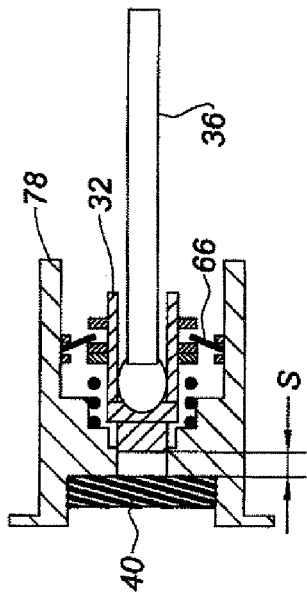
Fig. 14a
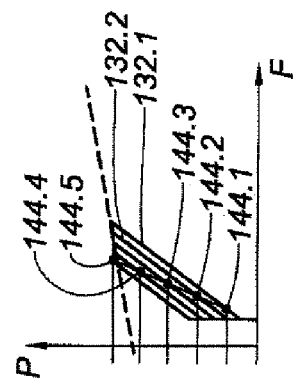
Fig. 18
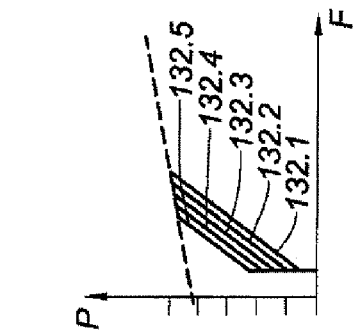
Fig. 17
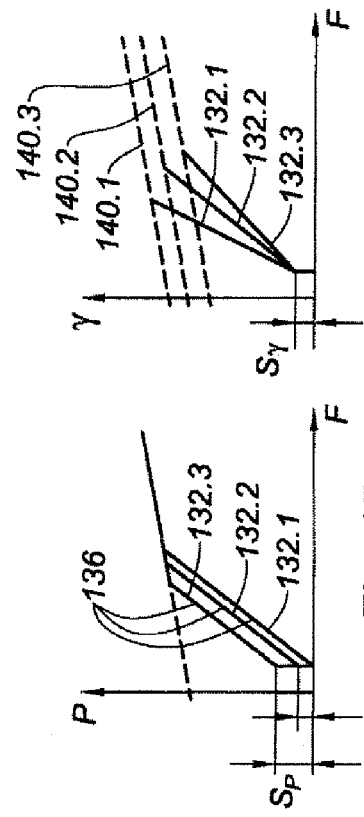
Fig. 16
Fig. 15

ADJUSTABLE BRAKE BOOSTER

BACKGROUND OF THE INVENTION

The present invention relates mainly to a brake booster that is adjustable, notably in terms of the value of the jump.

It is known practice to produce brake boosters that apply a force to a push rod of a master cylinder which force is an increasing function of the force applied by the driver to a control rod via a brake pedal. Typically, for a range of use, the boost ratio which is the ratio between the input force applied to the control rod and the output force from the booster and applied to the push rod, is constant. It is commonplace for several ranges of use to be employed, with several boost ratios, a first boost ratio for comfortable braking and a second boost ratio, higher than said first boost ratio, for emergency braking.

Among brake boosters of the known type, mention may, nonlimitingly, be made of vacuum pneumatic brake boosters, pressurized pneumatic brake boosters, hydraulic brake boosters (also known as hydroboost brake servos) as described, for example, in FR 2 727 370 and 49 49 61 846, pneumatic brake boosters with decoupling between the control rod and the push rod, like the one described, for example, in patent applications WO 2007/080106 and WO 2007/080158, and electric brake boosters like the one described in French patent application published under the number FR-2 860 474. Also known are brake boosters which further comprise means of commanding braking that are independent of the force applied by the driver to the brake pedal and widely known even in other languages by their English name of "active boosters". One example of such a pneumatic booster is described in patent EP 0 478 396.

Brake boosters are also described in documents DE 10 2006 030168, WO 03/066405 and EP 0 716 969.

In the known way, the boost ratio is regulated by a reaction device, notably a reaction disk made of non-compressible elastomer or a small-diameter piston on which the pressure of a rear chamber of the master cylinder is applied.

SUMMARY OF THE INVENTION

The Applicant Company has discovered that brake boosters of known type have their stroke controlled in terms of the relative position between a plunger driven by the control rod and a drive means, typically a piston, of the push rod that applies a force to a primary piston of a master cylinder.

The Applicant Company has discovered that, in the prior-art system, the booster always ensures dynamic equilibrium between the action and the reaction, notably in terms of the relative position of the control means, typically a three-way valve in the context of a pneumatic booster.

The Applicant Company has concluded from this that the dynamic equilibrium of known type limits the ways in which boosters of known type can operate.

The booster according to the present invention has means making it possible to create a non-zero offset and/or a variation, on command, for example at the command of an electronic control unit, between the position of equilibrium of the forces of reaction between the control means, typically a plunger and/or a control rod, and the means of applying force of the booster.

Advantageously, according to the invention, the "target" value for equilibrium of operation of the booster actuator is altered. A target value of a signal delivered by a position sensor is defined either by programming the electronic control unit or by selecting a coefficient in a program as a function of the braking characteristic or characteristics that it is desired to implement. Once the setpoint value has been determined, the electronic control unit commands the actuator using a setpoint value so that the actuator permanently and dynamically works toward achieving the previously defined and/or selected target value. The setpoint may be calculated as a function of torque, force, position or some other parameter.

The actuator moves the elements of the booster until the sensor emits the selected setpoint value.

The booster according to the present invention, by acting upon the value of the target signal for the control loop of the booster actuator acts on the clearance at equilibrium, that is to say on the geometric jump S, in order to obtain the desired function (of emergency brake boosting, braking with multiple boost ratios, compensation for variations in mass under driving conditions or the like) and/or the desired braking characteristic (braking with "bite", gentle braking that is easy to meter, or the like) according to the conditions under which the vehicle is being used, such as the speed at the time of braking, the total mass under driving conditions, the conditions of grip or the behavior of the driver (such as, for example, the speed at which he applies his foot to the brake pedal, the force of application, etc.).

A main subject of the invention is a device for commanding braking in a motor vehicle, comprising: first moving gear comprising a component that can be driven by the member via which the driver actuates the braking, typically a brake pedal; second moving gear comprising a brake boost actuator driving a force application element; a position sensor that senses the relative position of said first and second moving gear; a processor formulating control setpoints for commanding the brake boost actuator, characterized in that the processor formulates control setpoints for commanding the actuator in such a way as to generate a non-zero offset between the equilibrium positions of said first and second moving gear.

Another subject of the invention is such a device, characterized in that the processor formulates control setpoints for commanding the actuator in such a way as to cause said offset between the equilibrium position of said first and second moving gear to vary.

Another subject of the invention is such a device characterized in that it further comprises a reaction device applying a reaction force to said first moving gear and in that the equilibrium position at which the offset between said first and second moving gear is detected by the sensor is an equilibrium position for the reaction force on said first moving gear.

Another subject of the invention is such a device characterized in that said offset increases the jump with respect to the jump at the position in which there is no offset to the corresponding jump between the component that can be driven by the driver actuating member and the force applying element.

Another subject of the invention is such a device characterized in that the actuator comprises an electric motor.

Another subject of the invention is such a device characterized in that it comprises a boost piston driven by the pressure of a hydraulic fluid in a thrust chamber.

Another subject of the invention is such a device characterized in that it comprises: a hydraulic fluid pressure generator, comprising a variable-volume annular chamber and an annular piston which, on command, is driven by said electric motor; and connecting means for connecting the outlet of the variable-volume annular chamber to the thrust chamber.

Another subject of the invention is such a device characterized in that it further comprises means for, on command, connecting the hydraulic fluid pressure generating means to one chamber of a master cylinder.

Another subject of the invention is such a device characterized in that it further comprises means for, on command, hermetically isolating the variable-volume chamber from the thrust chamber.

Another subject of the invention is such a device characterized in that it further comprises means for, on command, hermetically isolating one chamber of the master cylinder from the brake fluid reservoir.

Another subject of the invention is such a device characterized in that the processor is capable of formulating setpoints for the actuator in such a way as to cause, during braking, said offset between the equilibrium position for reaction force on said component that can be driven by the actuating member and the position of the force application element of the actuator to vary.

Another subject of the invention is a method of manufacturing a device for commanding the braking of a motor vehicle, comprising: a step of manufacturing the mechanical and/or hydraulic components of said device; a step of assembling the manufactured components; characterized in that it further comprises a step of programming a processor to allow it to formulate setpoints for commanding an actuator so as to cause an offset between an equilibrium position for reaction force on a component that can be driven by the driver actuating member and the position of the force application element of the actuator to vary.

BRIEF DESCRIPTION OF THE DRAWINGS

The invention will be better understood through the description that follows and the appended figures which are given by way of non-limiting example and among which:

FIG. 12a is a schematic view in cross section of a reaction device in equilibrium that can be used in a booster according to the present invention corresponding to the neutral position of the sensor as illustrated in FIG. 11b;

FIG. 12b is a symbolic depiction in signal-processing terms, of the signal of the sensor at equilibrium;

FIG. 12c is a curve representing the master cylinder output pressure P as a function of the input force F applied to the control rod corresponding to the position of the reaction device shown in FIG. 12a;

FIG. 13a is a view similar to FIG. 12a for a dynamic equilibrium position of the detector illustrated in FIG. 11a;

FIG. 13b is a view similar to FIG. 12b for the position of the reaction device illustrated in FIG. 13a;

FIG. 13c is view similar to FIG. 12c for a position of the reaction device illustrated in FIG. 13a;

FIG. 14a is a view similar to FIG. 12a for a dynamic equilibrium position of the sensor corresponding to the position illustrated in FIG. 11c;

FIG. 14b is a figure similar to FIG. 12b but corresponding to the position of the reaction device as illustrated in FIG. 14a;

FIG. 14c is a view similar to FIG. 12c but corresponding to the position of the reaction device as illustrated in FIG. 14a;

FIG. 15 is a set of curves of the master cylinder output pressure P as a function of the force F applied to the control rod for various dynamic equilibrium positions corresponding to various aforementioned relative positions;

FIG. 16 is a set of curves illustrating the deceleration $\gamma$ of the braked vehicle equipped with a booster according to the present invention, as a function of the force F applied to the control rod corresponding to the conditions illustrated in FIG. 15;

FIG. 17 is a set of curves illustrating the various possible behaviors of the system according to the present invention as a function of a variable such as the master cylinder output pressure, the force applied to a brake pedal, the deceleration of the vehicle or the transported load;

FIG. 18 is a set of curves similar to FIG. 17 but illustrating the possible change in equilibriums during one and the same braking action in order to obtain unprecedented braking characteristics;

DETAILED DESCRIPTION

In FIGS. 1 to 20, the same references have been used to denote elements that are the same.

Figure 1:
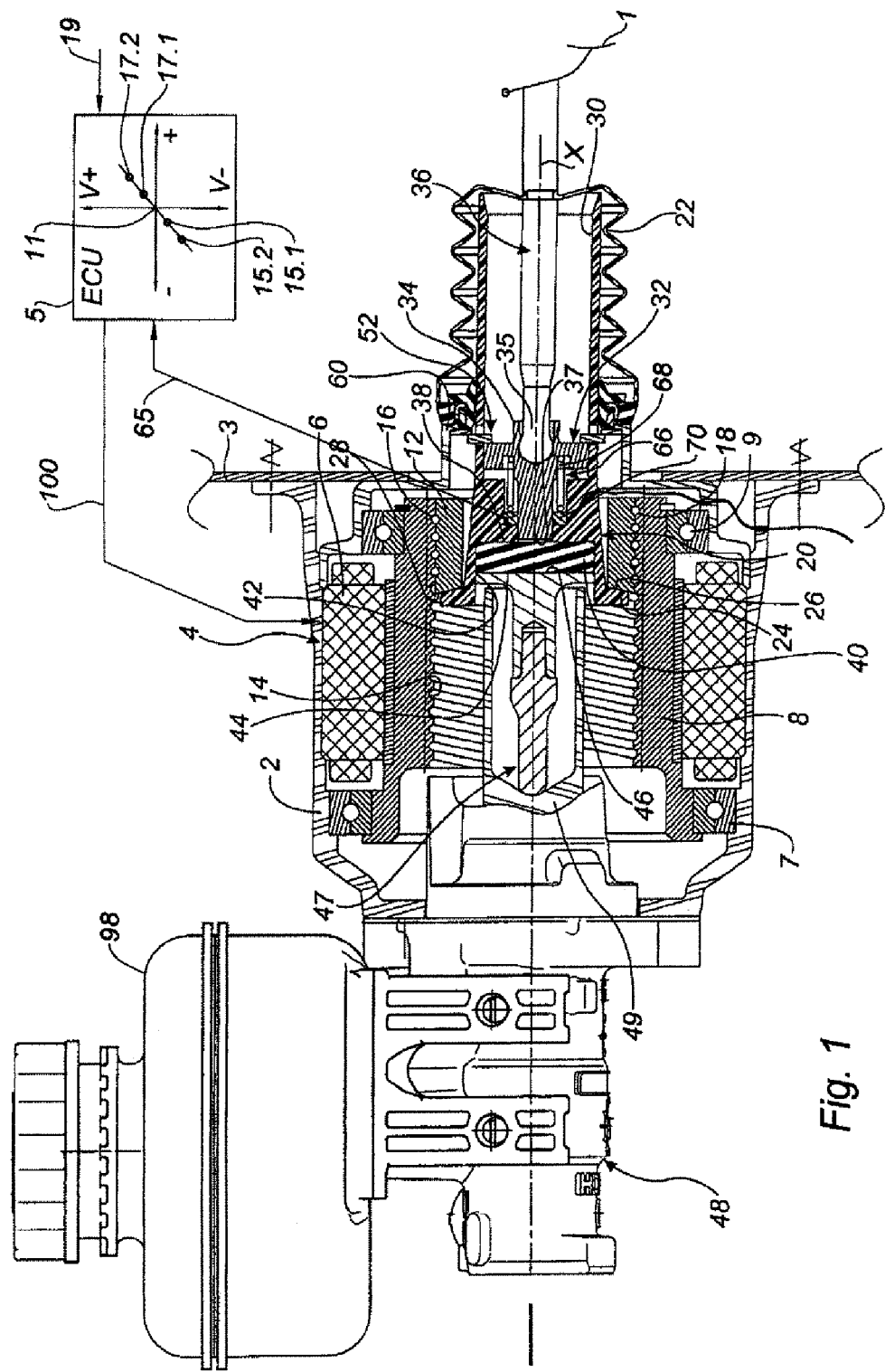
FIG. 1 is a view in cross section of a first exemplary embodiment of a booster according to the present invention.

FIG. 1 shows a first embodiment according to the present invention comprising a casing 2, a rotary electric motor 4 of axis X positioned inside the casing and which is able to drive a ring 12. In the example depicted, the motor is formed of a stationary electrical element known as a stator secured to the casing 2 and of a rotationally moving electrical element known as a rotor 8 inside the stator. The stator is electrically powered, for example, by an alternator (not depicted).

The booster is attached to a bulkhead 3 that separates an engine compartment from the passenger compartment of the motor vehicle.

Because the internal structure of the rotary electric motor is well known to those skilled in the art, it will not be described further.

The rotor 8 forms a nut of a screw-nut assembly, advantageously of the type comprising balls, positioned inside the casing. The rotor is prevented from translational movement but is able to rotate about the longitudinal axis X, the rotor is held in the booster casing by means of a first and a second set of ball bearings 7 and 9.

The screw-nut assembly 10 also comprises a screw formed by the annular ring 12 kept stationary in terms of rotation with respect to the booster casing but able to move translationally with respect to the rotor 8.

The rotation of the rotor 8 causes a translational movement of the ring 12 via a first screw thread 12 carried by the interior wall of the rotor, the annular ring for its part being provided on its exterior surface with a second screw thread 16 able to engage with the first screw thread 14. Advantageously, balls 18 are interposed between the exterior wall of the ring 12 and the interior wall of the cylindrical sleeve that forms the rotor.

The booster according to the present invention also comprises a boost piston 20 of axis X mounted inside the ring 12. The boost piston comprises, at a rear first end, a piston shank 22 and, at a front second end, a mount 24 resting via a rear face 26 against a transverse front face 28 of the annular ring 12. Passing through the boost piston 20 is a longitudinal passage 30 in which a plunger 32 is slidably mounted.

At a rear first end 34 the plunger 32 accepts a front first end 35 of a control rod 36 and is able via a front second end to come into contact with a first face 38 of a reaction disk 40 made of non-compressible and elastically deformable material such as an elastomer. The front second end of the plunger 37 is also known as the feeler.

The control rod 36 is connected by a rear second longitudinal end to a brake pedal that can be moved by a driver of a vehicle.

The reaction disk 40 is arranged in a housing 42 made in the front face of the boost piston so that it bears via a first face 38 against the boost piston by a radially external part. The reaction disk bears via a second face 44 against a rear first end 46 of a push rod 47 intended to transmit the force from the driver and the boost force from the booster to a piston 49 of a master cylinder 48 via a front second end 50.

At rest, there is a clearance between the feeler 37 and a central part of the rear face of the reaction disk and this clearance sets the magnitude of the jump of the booster.

According to the invention and as will be explained hereinafter, the jump can be adjusted dynamically by actuating the motor 4 on command. Thus, the position of first moving gear connected to the brake pedal 1, typically to the plunger 37 and/or to the control rod 36, with respect to the second moving gear connected to the piston of the master cylinder 48, typically with respect to the push rod, relative to the drive piston of the reaction disk 40, is constantly dynamically adjusted, even when at rest if so desired, during a braking action, by the action of the motor 4. The clearance or distance known as the geometric jump S in the remainder of this patent, between the feeler 37 and a central part of the rear face of the reaction disk 40 can be kept fixed for one vehicle or vehicle model, or can vary from one braking action to another for the same vehicle or even during one and the same braking action, according to the desired braking characteristics.

The booster also comprises a means of fixing the plunger with respect to the boost piston, these means 52 are formed by a key substantially perpendicular to the axis X and mounted fixedly on the rear end 34 of the plunger and passing with clearance through a transverse slot made in the piston shank 22.

At rest, the transverse ends 58' of the key butt against the booster casing in the embodiment depicted, the rear end of the casing comprises a shoulder 60 against which an annular washer that forms an abutment for the key 54 can rest.

Sealing means are advantageously provided for sealing between the casing and the exterior surface of the piston shank and connecting the casing and the control rod in such a way as to avoid the ingress of foreign particles liable to disrupt the correct operation of the booster according to the present invention.

According to the present invention, the booster also comprises means 66 for detecting the relative movement of the boost piston and of the plunger, this detection allowing an electronic control unit to command the actuation of the electric motor, and thereby the movement of the boost piston.

The means 66 are electrically connected to an electronic control unit (ECU) by a connector 65.

The motor 4 receives the control signal from the electronic control unit via the link 100.

Figure 10:
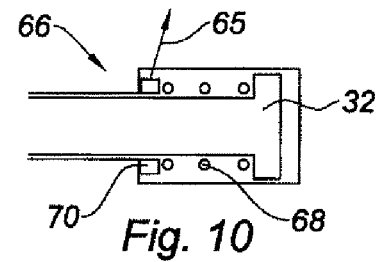
FIG. 10 is a view in cross section of a second exemplary embodiment of a sensor that can be used in the booster according to the present invention.

According to the first exemplary embodiment depicted in FIGS. 1 and 10, the means 66 for detecting the relative movement of the boost piston of the plunger comprise an elastic means interposed between the plunger and the boost piston and a force sensor 70, the elastic means 68 bears via a first end against the plunger and via a second end against the sensor 70. In the example depicted, the first end of the elastic means 68 bears against the bottom of an axial annular groove of the plunger. The force sensor 70 for its part in the example depicted is of substantially annular shape, secured firmly to the boost piston and surrounding the front end of the plunger.

In the rest position, the elastic means, which in this example has been depicted as being formed by a cylindrical spring, is preloaded. Thus, the force sensor at rest detects a force applied by the cylindrical spring, this magnitude of the force at rest forms a reference value V for the electronic control unit, as depicted at the point 11.

Advantageously, the screw pitch of the screw-nut assembly is reversible, so the boost piston can be returned to the rest position without activating the electric motor.

A "reversible" screw pitch is understood in the present application to mean a screw pitch that allows the screw to return to the rest position under the sole action of the pressure contained in the master cylinder and of the master cylinder piston return spring. There is no need to rotate the rotor in the opposite direction to the direction that moves the ring towards the master cylinder, known as the pressure rise direction. An irreversible screw pitch is understood in the present application to mean one that requires the rotor to be rotated in the opposite direction to the pressure rise direction in order to return the annular ring to the rest position.

Quite clearly, use of an elastic means other than a spiral spring is not outside of the scope of the present invention.

Unlike in the device described in FR 2 860 474, the electronic control unit 5 is not restricted to an automatic control function that tends, in a closed loop, to slave the value of the signal delivered by the connector 65 by the detection means 66 to a value V at rest at the point 11 (typically V at rest is 0). Rather, the electronic control unit 5 may, if necessary or beneficial, and advantageously in a closed loop, apply automatic control to the motor 4 in such a way that the signal, typically the voltage, delivered by the detection means 66 is a negative signal 15.1, 15.2, etc., corresponding for example to an increase in the jump or, on the other hand, slaved to positive voltage values such as 17.1 or 17.2. This automatic control can be performed by autonomous running of the programs in the electronic control unit 5 or, on the other hand, by executing a program in response to a command 19 received by the electronic control unit 5, for example via a bus such as the CAN bus commonly used in the automotive industry. A vehicle user interface command, such as a push button, a control knob or an input to be selected from a vehicle configuration menu allowing the driver to select the desired braking system behavior can also be connected to an input device connected directly or otherwise, for example at 19, to the electronic control unit 5.

Figure 2:
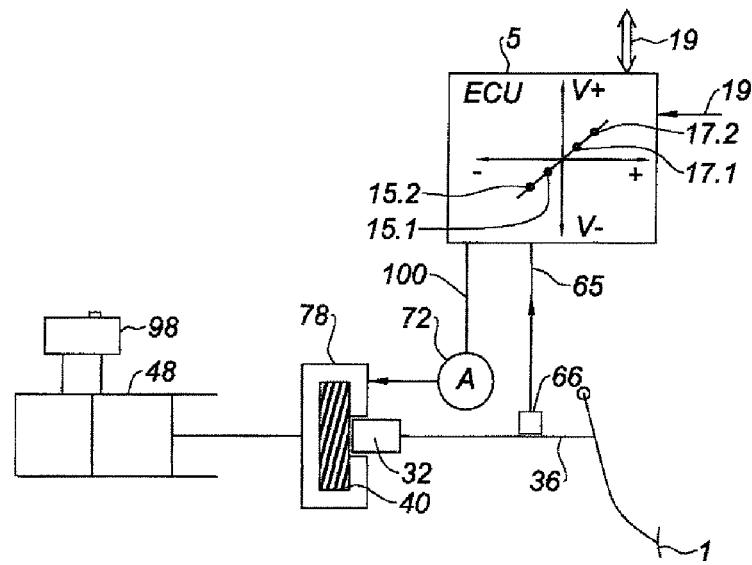
FIG. 2 is a schematic view illustrating the principle employed in the device according to the present invention.

As illustrated in FIG. 2, it is clearly understood that the present invention is not restricted to electric brake boosters but covers any booster that comprises an actuator 72 commanded by a control device advantageously an electronic control unit 5, a reaction device, typically a disk 40, position detection means 66 or means for detecting the variation in the position of the moving gear connected to the brake pedal and a means of generating pressure, advantageously a master cylinder 48.

Figure 3:
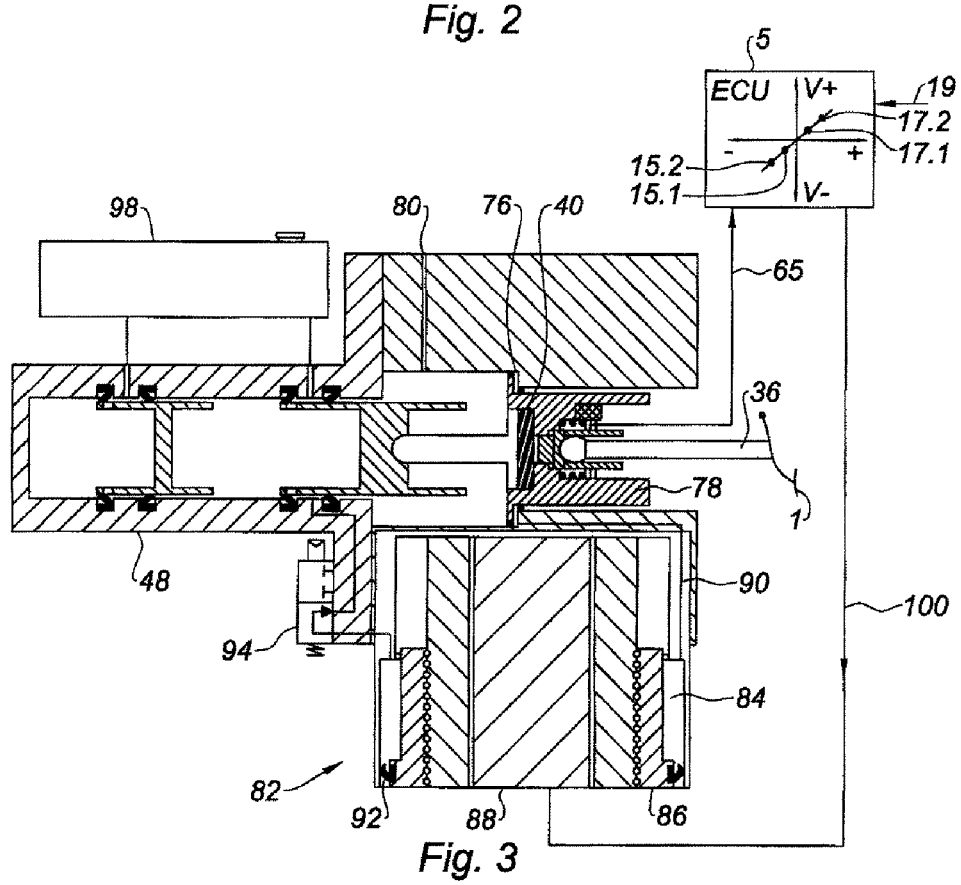
FIG. 3 is a schematic view in cross section of the preferred exemplary embodiment of the device according to the present invention.

FIG. 3 shows one exemplary embodiment of a booster according to the present invention, comprising a tandem master cylinder 48 additionally equipped with a thrust chamber 76 which, on command, advantageously from an electronic control unit 5, receives a fluid, typically brake fluid, under pressure.

Advantageously, the effective surface area of the thrust chamber 76 is tailored to suit the effective surface area of the primary and/or secondary piston of the master cylinder 48.

For example, the effective surface area of the thrust chamber 76 is increased over that of the chambers of the master cylinder if a low pressure (for example limited to $10^7$ Pa) of the source of pressurized brake fluid is to be compensated for. However, such a ratio of surface areas carries the risk of causing the brake pedal 1 to move in active modes.

When said surface areas are equal, the saturation pressure, that is to say the maximum pressure supplied by the high-pressure source is equal to the pressure generated by the boost function on the output side of the master cylinder. The pedal 1 remains immobile during the active modes.

For effective surface areas of the thrust chamber 76 which are lower than those of the master cylinder pistons, the volume of fluid that has to be supplied to the chamber 76 for a given braking value is decreased, making it possible to limit the output of the pump, to reduce the volume of the accumulator and/or to improve the dynamic response of the braking action, that is to say to reduce the response time of the braking system.

In the example advantageously illustrated, the booster according to the present invention comprises a hydraulic piston 78 the rear face of which delimits the thrust chamber 76 and the front face of which is positioned in a bore filled with a compressible fluid, typically air, advantageously vented to the atmosphere via a line 80. In the preferred embodiment illustrated, a recess in the hydraulic piston 78 accommodates the reaction disk 40 on the front face of which there bears a push rod 47. The rear face of the accommodating housing in the reaction disk 40 comprises a shoulder so that the corresponding section of the reaction disk can be pushed by the hydraulic piston 78, and there is a central opening to accommodate the anterior part of the plunger 37, the ratio of surface areas between said shoulder and said opening determining the default boost ratio, at the point 11, of the booster.

In the advantageous example illustrated, the means for generating the feed pressure in the thrust chamber 76 comprise a master cylinder 82 comprising a variable-volume chamber 84 in which the pressure of the brake fluid is increased by a piston driven, on command 100 by a motor 88, advantageously an electric motor.

In the advantageous example illustrated, the chamber 84 is an annular chamber connected by a line 90 to the thrust chamber 76. Advantageously, the motor is a stepping motor and drives the piston 86 via a ball screw.

In the advantageous example illustrated, the piston 86 comprises, at least at one of its axial ends, a hydraulic seal capable of withstanding the control pressures, preferably, as illustrated, a seal of the cup type.

Advantageously, the booster according to the present invention further comprises an electrically operated valve 94 that can, on command, hermetically seal a line 96 connecting the chamber 84 to the master cylinder 48. In the advantageous example illustrated, the line 96 opens, at the master cylinder end, between two cups which, in a known manner, delimit a master cylinder resupply chamber. This chamber is also connected to a brake fluid reservoir 98. Furthermore, at rest, the resupply chamber is connected by openings made in the primary piston to the primary chamber of the master cylinder 48. On the other hand, when the primary piston advances, the openings move beyond the anterior cup allowing the pressure in the braking circuit to rise. The electrically operated valve 94 is able, if the motor 88 fails during the course of a braking action, to release the pressure of the chamber 84 into the reservoir 98 and thus, in the event that the motor 88 fails, avoid undesired braking. Likewise, it should be noted that, in the absence of boost assistance following failure of the motor 88, thrust on the control rod drives the push rod 47 directly without the need to drive the motor 88.

Figure 4:
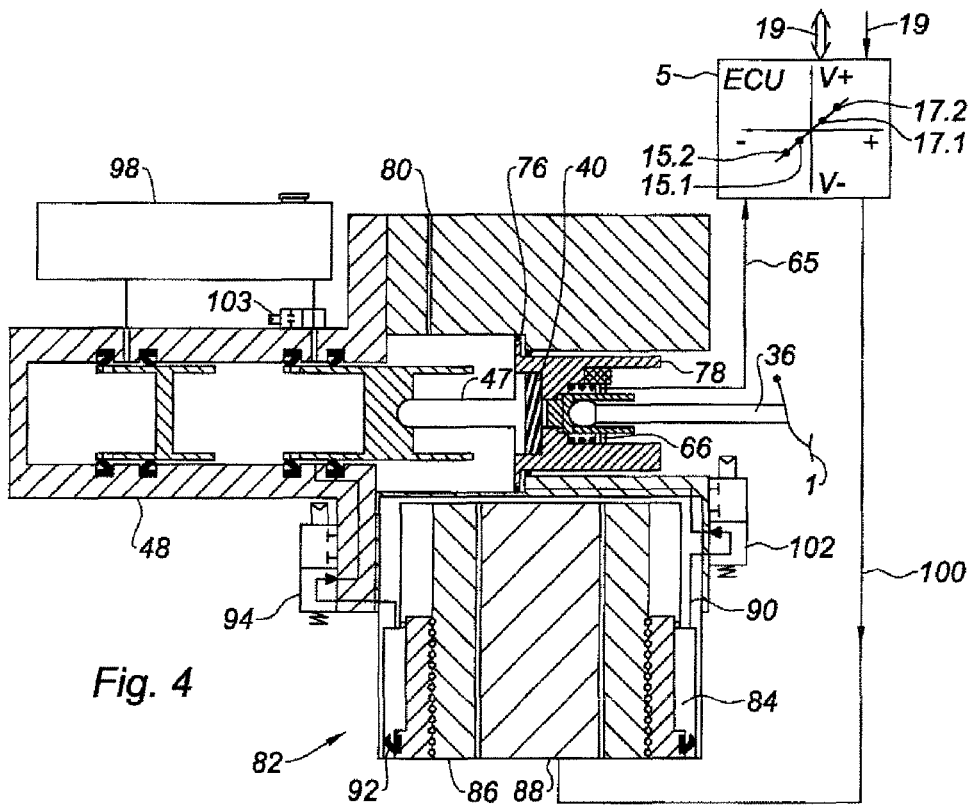
FIG. 4 is a schematic view in cross section of an alternative form of embodiment of the device of FIG. 3.

FIG. 4 shows the preferred exemplary embodiment of the booster according to the present invention which, apart form the elements of the booster of FIG. 3, comprises a second electrically operated valve 102 which, on command, isolates the thrust chamber 76 from the chamber 84 of the master cylinder 82. Thus it is possible to maintain constant hydraulic brake pressure independently of action of the motor. This may be beneficial, for example, for constant pressures on the brake pedal, for example when stopped at a red light, stopped for a prolonged length of time, or driving downhill with the brakes constantly applied. Thus, in such instances, there is no need to actuate the motor 88. The electrical power consumption and wear of the motor are thus reduced. The second electrically operated valve 102 is particularly beneficial if reversible screws are being used, that is to say screws that can be turned by a variation in pressure in the motor chamber 76.

Advantageously, the booster according to the present invention further comprises a third electrically operated valve 103 which, on command, isolates the primary chamber of the master cylinder 48 from the brake fluid reservoir 98. It is thus possible to pre-fill the braking circuit through the master cylinder by opening the electrically operated valve 94 and closing the valve 103 so as to prevent the pressure supplied to the primary chamber from escaping to the reservoir. It should be noted that the pre-filling of the brakes is carried out with no forward movement of the control rod 36, or therefore of the brake pedal 1. Likewise, the combination whereby the electrically operated valves 94 are open and the electrically operated valve 103 is closed allows active braking modes, that is to say modes at the command of the electronic control unit 5, to be implemented without any need for action on the part of the driver and without any movement of the pedal 1. It should be noted that the secondary piston transmits to the secondary chamber the pressure that is in the primary chamber, notably in active braking scenarios.

The pre-filling of the brakes may be highly beneficial in shortening braking distances and/or in allowing use of hydraulic braking with increased retreating of the piston which exhibits zero and/or at the very least reduced, residual (undesired) braking torque.

Furthermore, the electrically operated valve 103 or another means of hermetic isolation, on command, can be actuated in such a way as to isolate at least one of the chambers of the master cylinder 48, typically the primary chamber, so as, for example, to reduce the dead travel at the time of actuation of the brakes, and preferably before the resupply holes in the primary piston have traveled beyond the front cup of the primary chamber of the master cylinder or, if an abnormally high temperature has been detected during a braking action that could, were the braking action to be released, cause the brake fluid to boil. However, upon complete release of the brakes, that is to say where no pressure is applied to the brake pedal, possibly after a time delay has elapsed, the electrically operated valve 103 is re-opened so as to avoid undesired braking.

Figure 5:
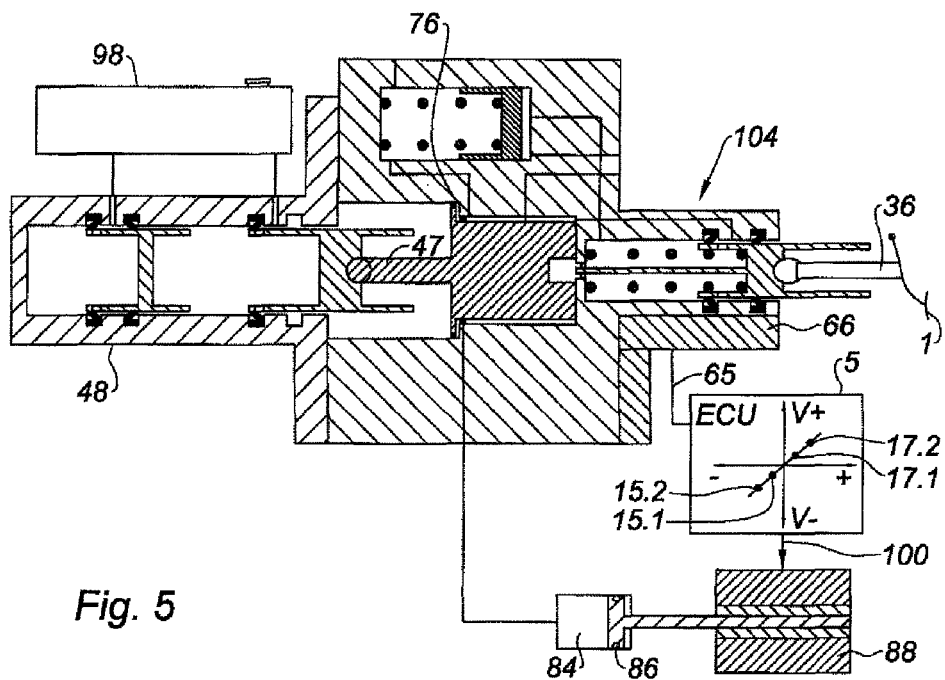
FIG. 5 is a schematic view in cross section of a fourth embodiment of a booster according to the present invention.

It must be clearly understood that, as illustrated in FIG. 5, use of a pedal feel simulator 104 associated with position detection means 66 belonging to an electronic control unit 5 used to command active braking means is not outside the scope of the present invention.

In the example illustrated in FIG. 5, the simulator comprises two hydraulic chambers connected by lines, the boost and braking devices being analogous to those of FIG. 3. As an alterative, the electric motor 88, on command, causes the advance movement of a piston 86 of a master cylinder that is not necessarily annular for supplying a thrust chamber 76 with pressurized brake fluid.

Use of a simulator makes it possible, at the expense of an increase in complexity of the system and of its cost, for the control setpoint generated in the simulator to be completely dissociated from the pressure actually generated in the brake. Doing this may prove extremely beneficial in the case of collaboration between various braking systems, such as, for example, the regenerative braking system used in hybrid vehicles which comprises not only a combustion engine but also an electric motor both capable, under braking, to behave like an energy recuperating generator.

Figure 6:
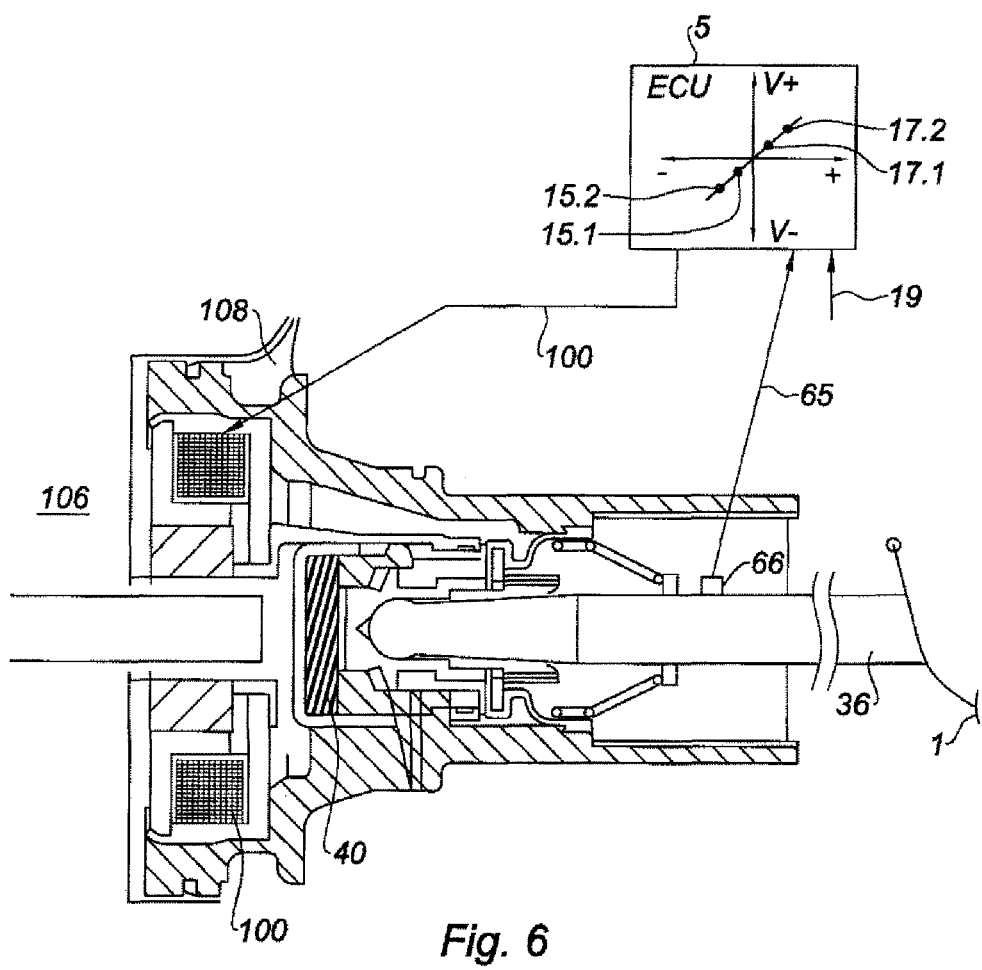
FIG. 6 is a view in cross section of the central element of a fifth exemplary embodiment of a booster according to the present invention.

FIG. 6 shows the central part of a vacuum pneumatic brake booster according to the present invention. The pneumatic booster of FIG. 6 comprises, contained inside a casing that has not been depicted, a front chamber 106 connected to a vacuum and a rear chamber 108 that can be connected, at the command of a three-way valve, to atmospheric pressure. The three-way valve may be commanded, not only by the control rod 36, but also by an actuator 110 that receives a control signal 100 from the electronic control unit 5.

Advantageously, the actuator is an electromagnet.

Figure 7:
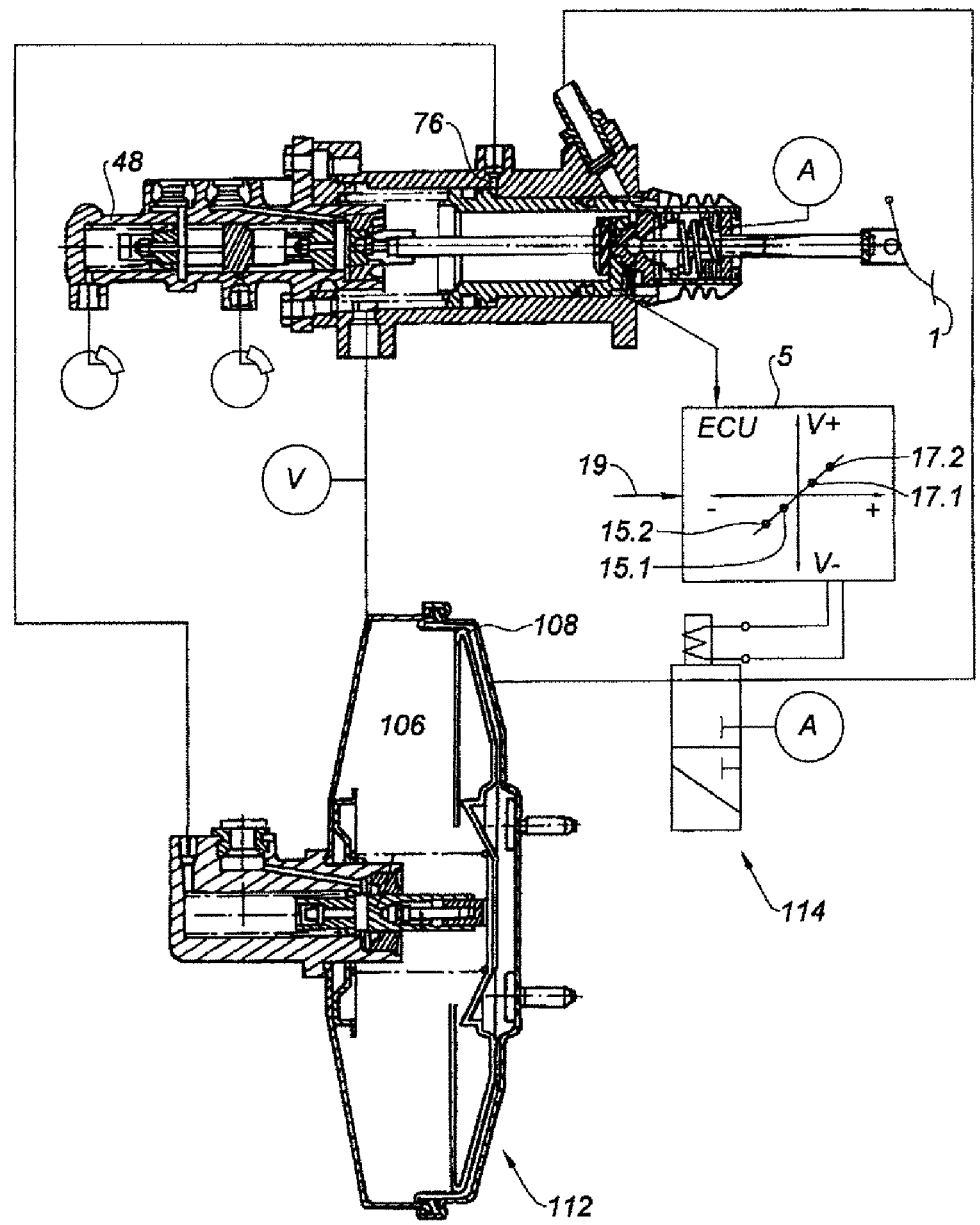
FIG. 7 is a view in cross section of a sixth exemplary embodiment of a booster according to the invention.

FIG. 7 shows an exemplary embodiment of a hydraulic booster according to the present invention, comprising a hydraulic thrust chamber 76 supplied with pressurized fluid by a vacuum pneumatic booster the filling of the rear chamber 108 of which is performed by an electrically operated valve 114 commanded by the electronic control unit 5.

Figure 8:
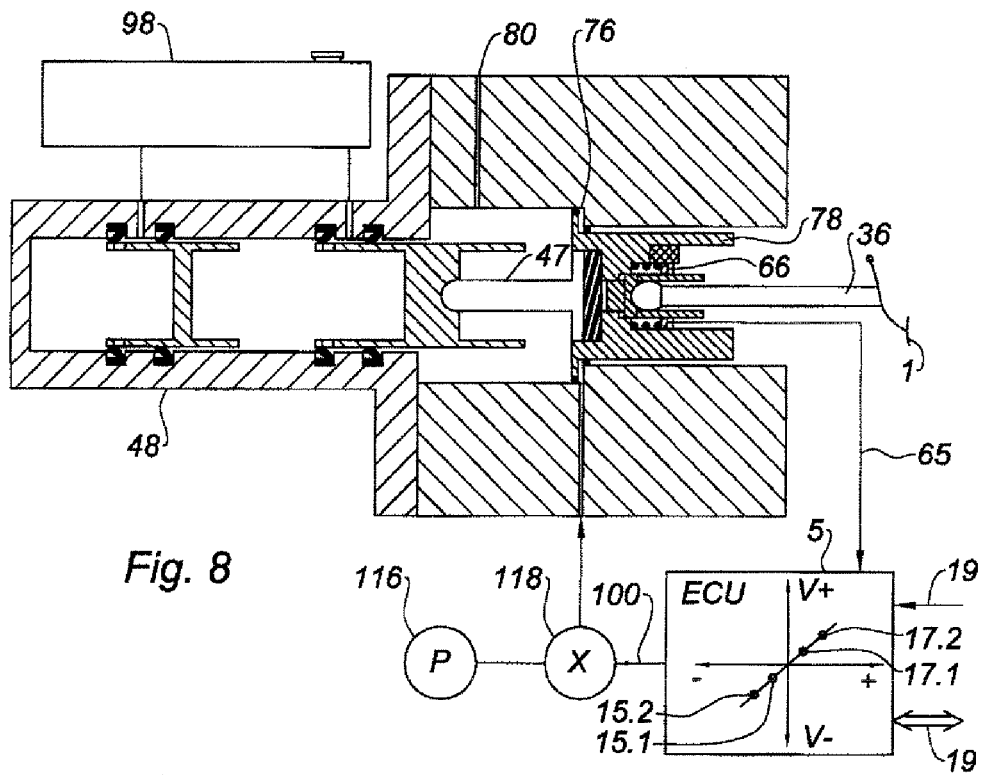
FIG. 8 is a schematic view in cross section of a seventh exemplary embodiment of a booster according to the invention.

FIG. 8 shows an exemplary embodiment of a booster according to the present invention comprising a thrust chamber 76 supplied, at the command of the electronic control unit 5, by a pump 116, advantageously via a hydraulic circuit 118 that comprises, for example, a valve and an accumulator. Use may be made of a dedicated, advantageously electric, pump 116 or, on the other hand, use may be made of a pump already present in the motor vehicle such as a hydraulic power steering pump or an electronic stability program (ESP) pump.

Figure 9:
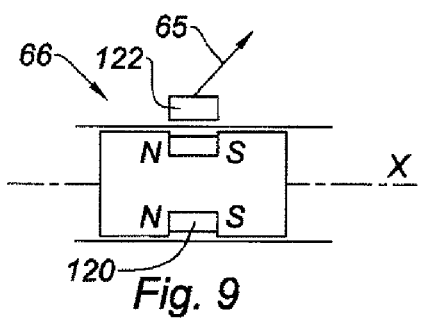
FIG. 9 is a view in cross section of a first exemplary embodiment of a sensor that can be used in the booster according to the present invention.

FIG. 9 shows a first exemplary embodiment of the means 66 of detecting the relative position of the moving gear comprising the brake pedal 1 with respect to a second moving gear connected to the piston of the master cylinder in the example of FIG. 9, the first moving gear being equipped with a magnet 120 positioned facing a magnetic field detector 122, for example a Hall effect detector. Advantageously, the magnet 120 is an annular magnet and the detector 122 is a proportional detector. The axial movement along the axis X causes the magnetic field at the detector 122 and therefore the voltage 65 delivered by this detector, to vary. Advantageously, the arrangement of north and south poles on the magnet 120 is axially along the axis X.

FIG. 10 shows, on a larger scale, the detector used in the device of FIG. 1 and which comprises a force sensor 70 compressed by a helical spring 68. Advantageously, the spring has a constant spring rate k so that the force F applied by this spring to the sensor is proportional to the movement of the plunger 32 a shoulder of which compresses the spring.

Figures 11A, 11B, 11C:
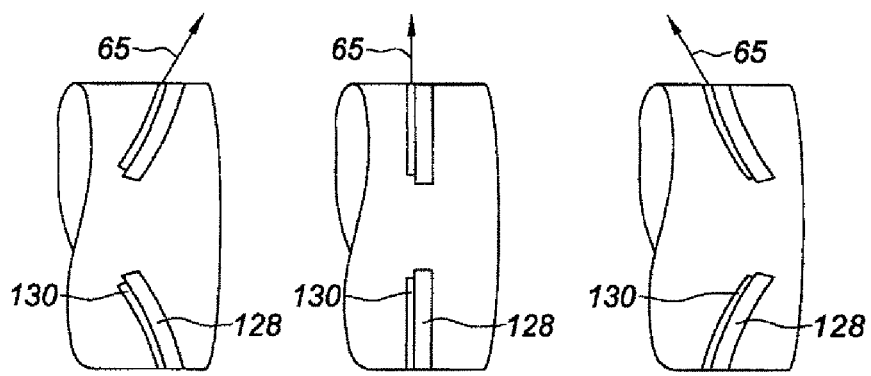
FIG. 11a is a view in cross section of a third exemplary embodiment of a sensor that can be used in a booster according to the present invention, in a first position.
FIG. 11b is a similar view of the sensor of FIG. 11a, but in a second position.
FIG. 11c is a similar view of the sensor of FIG. 11a, but in a third position.

FIGS. 11a, 11b and 11c show the preferred exemplary embodiment of the detection means 66 comprising an elastic washer 128 bearing, on its surface, one or more strain gauges, for example circumferential and/or radial strain gauges 130. The washer 128 comprises means of anchorage on a first moving gear and drive means connected to the second moving gear. Advantageously, the washer 128 comprises peripheral means of anchorage on the moving gear driven by the booster actuator according to the present invention. Typically, the periphery of the washer 128 is anchored in a bore of the piston. The drive means of the radially internal edge of the washer 128 are advantageously carried by the plunger 32. Thus, the means 66 of FIG. 11 are able to detect the relative movement of the first moving gear connected to the brake pedal with respect to the second moving gear driven by the actuator.

FIG. 11a depicts the washer deformed forward, that is to say that the plunger has taken the lead over the piston. In other words, the value of the jump has been reduced in the position illustrated in FIG. 11a, which corresponds to the point 17.i (17.1, 17.2, etc.) the voltage V delivered by the strain gauge being positive.

In FIG. 11b the washer 128 is not deformed and this corresponds to the point 11, the jump being at its nominal value and the voltage V being zero. It should be noted that this is the only position accessible during operation of the motor 4 of the booster described in patent FR 2 860 474.

In FIG. 11c, the washer is deformed to the rear, the strain gauge 130 delivering a signal 65 that has a negative voltage corresponding to the point 15.i, (15.1, 15.2, etc.) with the piston having taken the lead over the plunger and the jump increased.

Of course, reversing the polarity of the strain gauge 130 or changing the position of the origin is not outside of the scope of the present invention.

Likewise, use of an intelligent sensor, of a sensor that delivers a numerical value, a pulse width modulator (PWM) or the like is not outside the scope of the present invention.

FIG. 12a shows the control module of a booster according to the present invention in a neutral position in which the geometric jump S, that is to say the distance between the anterior face of the feeler 32 and the rear face of the reaction disk measured along the axis X is determined by the geometry of the components used. This is a neutral position in which the washer 128 is in the position illustrated in FIG. 11b.

FIG. 12b illustrates the position of the control signal 100 delivered by the electronic control unit to the actuator at the point 11. This symbolic depiction indicates that, on the one hand, the washer 128 is not deformed and that therefore the strain gauge 130 delivers a zero signal even when the piston is being controlled by the actuator. FIG. 12c shows a curve 132 illustrating the output pressure P of the master cylinder as a function of the force F applied by the driver to the control rod 36 of a booster according to the present invention, of which equilibrium afforded by the actuator corresponds to the position illustrated in FIG. 12a.

A first portion 134 at zero pressure corresponds to the instigating force.

A second portion Sp which is substantially vertical corresponds to a rise in pressure at constant force at the start of braking. The pressure jump Sp is connected to an inclined straight portion the gradient of which corresponds to the boost ratio of the booster. The portion 136 is connected to a portion 138 of shallower gradient corresponding to saturation of the booster, that is to say the point where the booster is providing the maximum force of which it is capable, the increase in pressure resulting only from the increase in the force applied to the control rod 36 via the brake pedal.

FIG. 13a shows the device of FIG. 12a in which the first moving gear comprising the plunger 37 has taken the lead over the piston. The result of this is that, firstly, the washer 128 is deformed in a similar way to the way illustrated in FIG. 11a and that secondly, the geometric value of the jump S is reduced by comparison with the value of the jump S of the device kept in equilibrium in FIG. 12a.

This fact is symbolized in FIG. 13b by the fact that the strain gauge 130 is delivering a positive voltage V+ corresponding to the flexing of the washer 128. It should be noted that, depending on the type of braking desired, the actuator 72, typically the electric motor 4, can keep the position of FIG. 13a constant or, on the other hand, cause the positional offset of the two moving gears and therefore the direction and amplitude of deformation of the washer 128 to vary.

FIG. 13c shows that the pressure jump Sp has decreased on curve 132, changing the way in which the vehicle behaves under braking.

The configuration of FIG. 13 may, for example, make it possible to reduce the bite of the brakes both in normal use and, for example, when the vehicle is transporting a light weight or if somebody wishes smooth and/or gentle automatic braking or fine control over braking, for example when actuating an automatic parking brake.

FIG. 14a illustrates the device of FIG. 12a with a washer 128 deformed toward the rear illustrated in FIG. 11c in so far as the second moving gear driven by the actuator 72, typically the motor 4, has taken a lead over the first moving gear comprising the plunger 37.

This results in an increase in pressure jump Sp of which the extreme example illustrated in FIG. 14c corresponds to a vertical line Sp directly connecting a zero pressure to a saturation pressure without any inclined segment 136. In FIG. 14b, the value of the signal is illustrated at the point 15.i.

This type of behavior may prove particularly beneficial in the case of emergency braking or rapid braking allowing a driver, even a fearful one, who dare not press the pedal too hard or who is physically weak, to obtain a short stopping distance and/or a substantial deceleration. Thus control of the actuator 72, typically of the motor 4, makes it possible to obtain an emergency braking or brake assist function.

FIG. 15 shows three curves of the pressure P available on the output side of the master cylinder as a function of the force F applied by the driver for a possible use of the booster according to the present invention with, for example, a command that includes a compensation 100, emitted by the electronic control unit 5, for the load of the vehicle. Curve 132.1 corresponds to a zero or negligible jump corresponding to a position extending slightly beyond the one illustrated in FIG. 13a. Curve 132.1 corresponds, for example, to the behavior desired and obtained by the booster according to the present invention, for a vehicle with a payload lower than the normal customary payload of the vehicle, for example a scenario in which the payload of the vehicle consists mainly of the driver himself. Curve 132.2 corresponds to the neutral position illustrated in FIG. 12a. Curve 132.2 corresponds to a normally laden vehicle. Curve 132.3 depicts the case of an increased jump (but not as increased as the jump illustrated in FIG. 14a). Curve 132.3 corresponds to a vehicle transporting a load higher than the normal payload. The load transported by the vehicle or, more specifically, the moving mass, is determined in the known way, for example by a vehicle stability control system known in the art as an ESP system and/or an accelerometer.

Thus, the three curves have segments 136 that are parallel to one another and the gradient of which corresponds to the boost ratio. It is interesting to compare these curves with the sets of curves 138.1, 138.2 and 138.3 of FIG. 16 which illustrates the deceleration γ as a function of the force F. Curve 138.1 in FIG. 16 corresponds to the case of curve 132.1 of FIG. 15. Curve 138.2 of FIG. 16 corresponds to curve 132.2 of FIG. 15. Curve 138.3 of FIG. 16 corresponds to curve 132.3 of FIG. 15. It will be noted first of all that it is advantageous to obtain a deceleration jump Sγ which is constant for all three curves 138.

In other words, the deceleration at the end of the jump γ is the same for all three curves. By contrast, after the jumps, the gradients of the curves 138.1, 138.2 and 138.3 increase to meet the saturation curves 140.1, 140.2 and 140.3 respectively, which are mutually parallel. Curve 140.3 is above curve 140.2 itself above curve 140.1. It should be noted that the deceleration saturation curves take account of the total force applied both by the brake boosters and by the driver. It can be seen better in FIG. 16 that the brake behavior and feel are completely different according to the relative positions of the two sets of moving gear. Notably, for a lower pressure jump (curve 132.1) the driver can be brought to a higher saturation curve (140.1) and therefore to a shorter stopping distance and/or to a stopping distance that remains substantially unchanged even for a higher payload, that is to say a higher moving mass.

FIG. 17 illustrates a set of curves of pressure P as a function of force F for various settings of the system jump according to the present invention ranging, for example, from a curve 132.1 that optimizes braking for a hydraulic pressure of $2 \times 10^6$ Pa, a curve 132.2 that optimizes braking for a hydraulic pressure of $4 \times 10^6$ Pa, a curve 132.3 that optimizes braking for a hydraulic pressure of $4 \times 10^6$ Pa, a curve 132.4 that optimizes braking for a hydraulic pressure of $8 \times 10^6$ Pa, to arrive at a curve 132.5 corresponding, for example, to $10^7$ Pa. In addition, as illustrated in FIG. 18, the changes to be offset between the sets of moving gear may evolve over the course of one and the same braking action as the driver gradually presses harder on the brake and/or as a function of the pressure P and/or of the deceleration γ. It is, for example, possible to switch from the curve 132.1 to the curve 132.2, 132.3, 132.4 toward the curve 132.5 at the time of saturation. In FIG. 18, the points that correspond to the pair of values (F, P) for pressures of $2 \times 10^6$ Pa, $4 \times 10^6$ Pa, $6 \times 10^6$ Pa, $8 \times 10^6$ Pa and $10^7$ Pa bear the respective references 144.1, 144.2, 144.3, 144.4 and 144.5. The straight-line segment connecting said points 144.1 to 144.5 bears the references 146 and corresponds to the possible behavior of a braking system according to the present invention, a careful choice of the points 144.i (144.1, 144.2, . . . , 144.5) making it possible, if that is desired, to obtain braking system behavior that would be impossible to achieve with any device of known type. It is possible to increase and/or decrease a boost ratio, linearly or otherwise, to describe a curve such as an arc of a circle, of the sinusoidal, hyperbolic, or some other type.

Further, it is possible to reduce the price of the booster according to the present invention by tolerating, in industrial production, a wider spread on geometric jumps while at the same time providing compensation for this spread by a correction made by the motor 4 and/or the actuator 72. Likewise, according to the present invention, it is possible, by using the actuator, on a command 100 from the electronic control unit 5, to reduce the tolerance on the jumps that can be achieved in manufacture. Likewise, it is possible when optimizing a braking system, to carry out tests on the various pedal feels without modifying the device, solely by changing the characteristics of the control loop for the automatic control of the motor 4 and/or of the actuator 72. These advantages can be added to and/or combined with the advantages already mentioned, namely the possibility of achieving a variable jump, of varying the boost ratio, of obtaining double or multiple boost ratios, of having boost ratios that are able to vary nonlinearly with the force, of affording emergency brake assist function, of compensating for braking as a function of the load carried by the vehicle, of taking multiple braking elements (hydraulic braking plus regenerative braking) into consideration with a corresponding deceleration to the braking setpoint (force F applied to the pedal 1) independently of the respective contributions by the hydraulic and regenerative braking system and/or the change in pedal feel, notably the disappearance of the hard pedal feel during active braking mode such as those generated by the automatic braking comfort devices for example those of the ACC type.

Advantageously, the electronic control unit 5 may estimate the type of pedal feel desired by the driver or drivers and adapt the pedal feel to the desired pedal feel.

Figure 19:
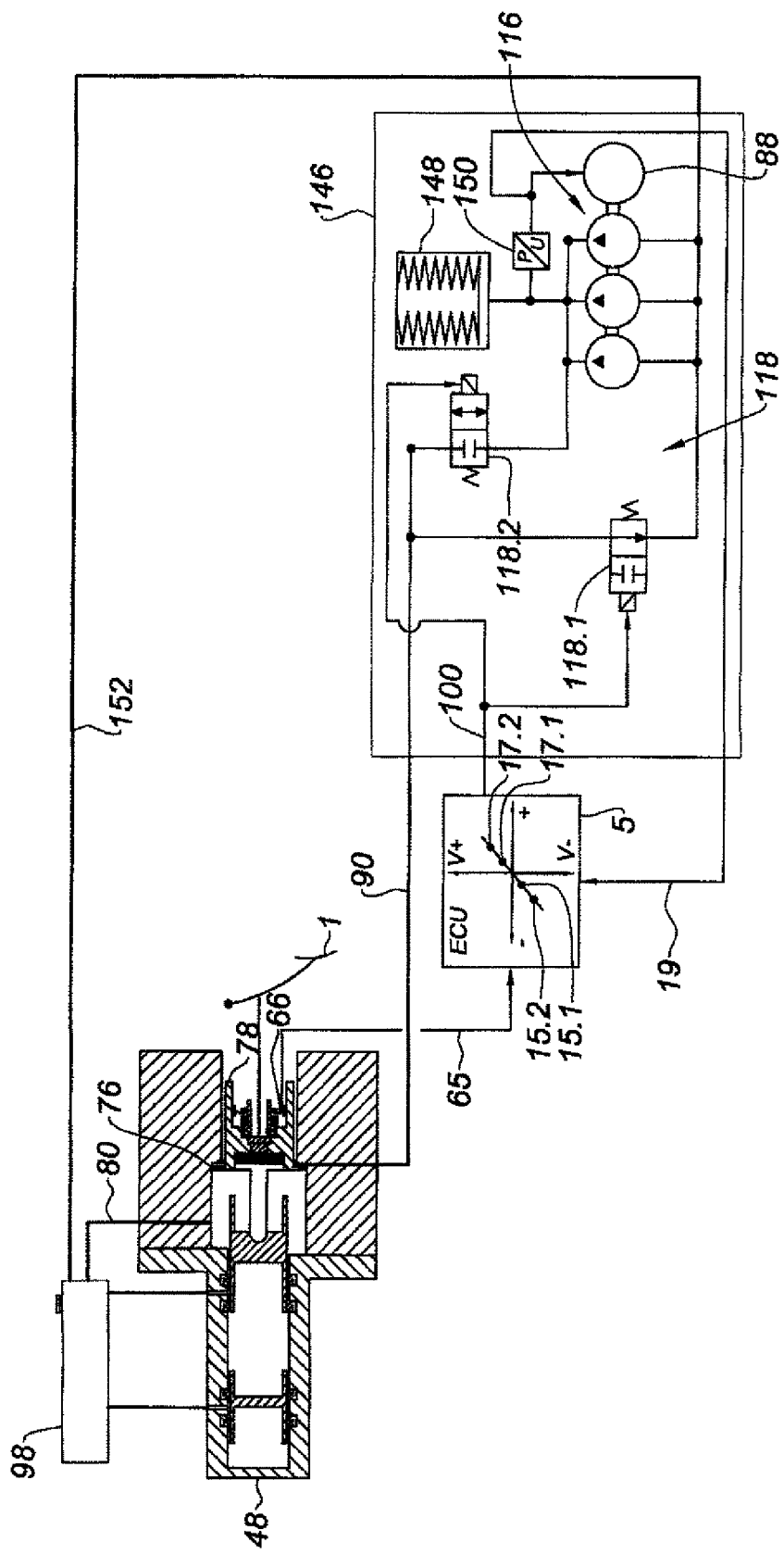
FIG. 19 is a schematic view in cross section of an eighth exemplary embodiment of a booster according to the present invention.

FIG. 19 shows one exemplary embodiment of a booster according to the present invention comprising a hydraulic unit 146 comprising a pump 116 and a hydraulic control circuit 118 comprising, for example, a first electrically operated valve 118.1 for removing fluid from the thrust chamber 76 and a second electrically operated valve 118.2 for supplying pressurized hydraulic fluid to said thrust chamber 76. Advantageously, the valves 118.1 and 118.2 are on/off valves that can be controlled either continuously or, advantageously, by pulse width modulation (PWM).

Advantageously, the high-pressure outlet of the pump 116 is connected to an accumulator 148 allowing the pump 116 to be switched off when its operation is not required. Advantageously, a pressure sensor 150 measures the pressure available at the outlet of the pump 116/of the accumulator 148. Advantageously, the pressure sensor 150 is connected to a control device that controls a motor of the pump 116, and by a link 19 to the electronic control unit 5. Of course, the use of other pressure sensors, for example in the primary and secondary braking circuit, connected to the electronic control unit 5 and providing pressure control, is not outside of the scope of the present invention.

In the example illustrated in FIG. 19, the line 80 is connected to the reservoir 98 in such a way as to fill the intermediate chamber lying between the chamber 76 and the primary chamber of the master cylinder, at atmospheric pressure. Thus, the various sealing elements, typically the cups, are immersed in brake fluid on their two opposing sides.

The device of FIG. 19 operates in substantially the same way as the device of FIG. 8.

However, the use of the hermetic unit 146, already available in an electronic stability system (ESP) on a modern vehicle allows the device according to the invention to be installed at only a modest additional cost.

In the preferred example illustrated, the low-pressure inlet of the pump 116 is connected by a line 152 to the reservoir 98. Each of the chambers of the tandem master cylinder 48 is connected to said reservoir 98 by a line.

Figure 20:
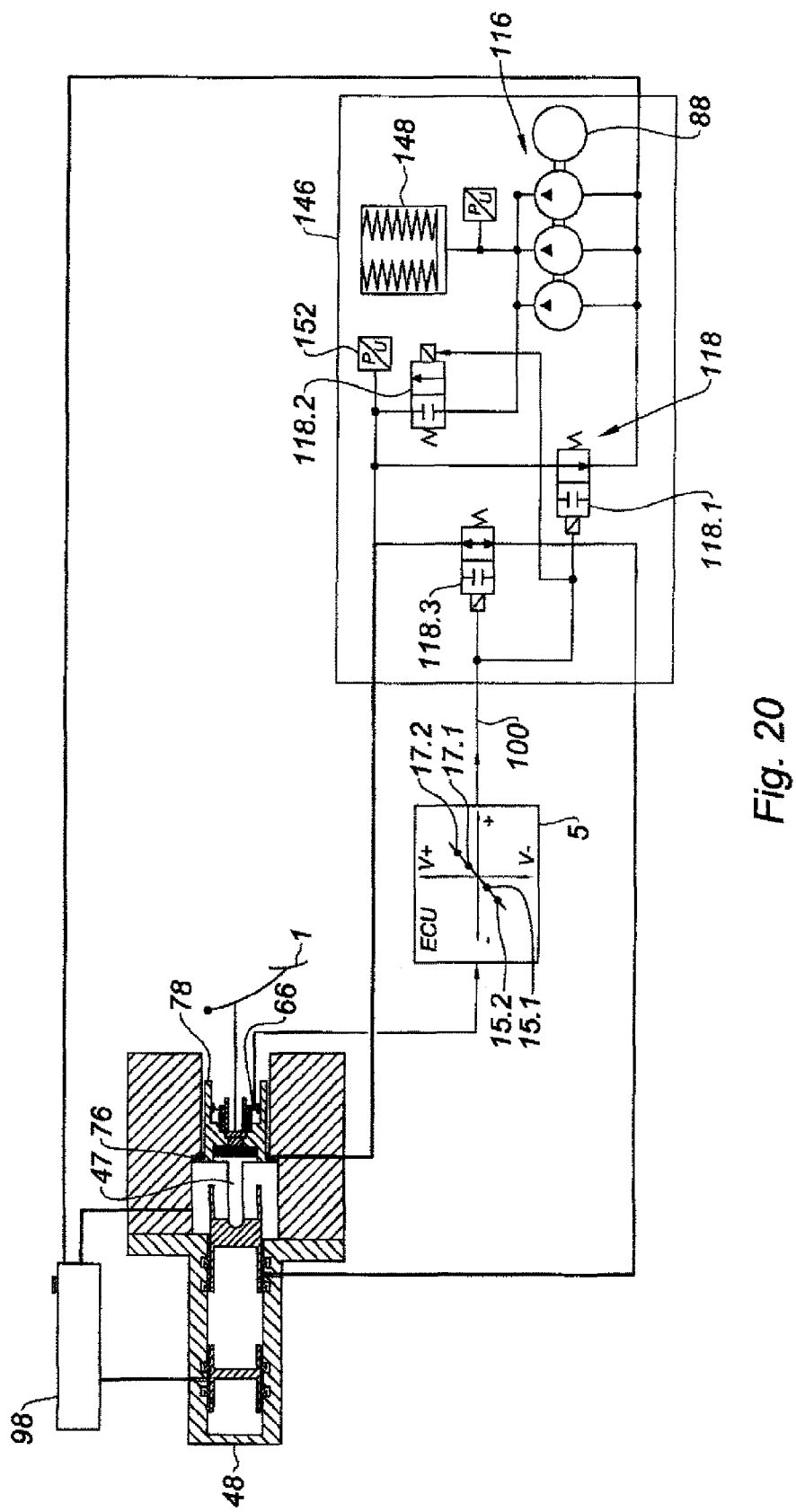
FIG. 20 is a schematic view in cross section of a ninth exemplary embodiment of a booster according to the present invention.

FIG. 20 shows an alternative form of embodiment of the device according to the present invention of FIG. 19 in which the hydraulic control circuit 118 further comprises a third electrically operated valve 118.3 which, on command, connects a pressure source directly or indirectly to the primary chamber of the master cylinder 48.

Upon a variation in the position of the brake pedal 1, corresponding to a variation in the braking setpoint, for example an application of braking, an increase in the braking, a reduction in the braking, or the braking coming to an end, the sensor 66 delivers a corresponding signal 65 to the electronic control unit 5. The electronic control unit 5 formulates a setpoint for the variation in brake boosting. When the matter is one of an increase in braking, the electrically operated valve 118.2 is opened until the pressure in the thrust chamber 76 displaces the hydraulic piston 78 until the sensor 66 delivers a signal 65 corresponding to the desired offset between the first and the second sets of moving gear. When this value is reached, the valve 118.2 hermetically isolates the high-pressure stage of the hydraulic unit 146. During the supply of pressurized brake fluid to the thrust chamber 76, the valve 118.1 connected to the low-pressure stage of the hydraulic unit 146 is closed.

During braking at a constant level, the two valves 118.1 and 118.2 are closed. Thus, constant braking does not consume high-pressure brake fluid.

For brake release, the electronic control unit 5 closes the valve 118.2 and opens the valve 118.1 until the pressure in the thrust chamber 76 creates an offset between the first and second sets of moving gear corresponding to the desired setpoint value.

In the absence of any braking, the electrically operated valve 118.1 is opened so as to ensure that atmospheric pressure obtains in the thrust chamber 76 while the electrically operated valve 118.2 is closed.

Furthermore, it is advantageous for the primary chamber of the master cylinder 48 not to be connected to the reservoir 98, resupply being afforded by the electrically operated valve 118.3. Thus (unlike in the example illustrated), it is possible to dispense with the cup and the resupply holes in the primary piston of the master cylinder 48.

Advantageously, the hydraulic unit 146 further comprises a second pressure sensor 152 that measures the pressure delivered to the thrust chamber 76.

Advantageously, as in the previous cases, the effective cross-sectional area of the thrust chamber 76 is equal to the effective cross-sectional area of the primary piston and/or of the secondary piston of the master cylinder 48. In the example advantageously illustrated, the valve 118.3, on command 100, connects the high-pressure stage of the hydraulic unit 146 to the primary chamber of the master cylinder 48.

The opening of the valve 118.3, at the command 100 of the electronic control unit 5, brings about the pre-filling and/or the filling of the primary chamber of the master cylinder 48 allowing the active modes to operate, that is to say without the need for the pedal 1 of the braking system to be depressed, for example for automatic braking at the command of a radar (ACC), parking braking or the like.

The increase in pressure in the primary cylinder of the master cylinder 48 pushes on the secondary piston which, in turn, causes the rise in pressure in the secondary circuit.

It should be noted that the fact that the effective cross-sectional areas of the primary piston and of the thrust chamber 76 are equal or near-equal means that high-pressure brake fluid can be supplied to the brakes without the pedal 1 being depressed and without having any need to resort to a simulator (unlike the case illustrated in FIG. 16). In addition, the absence of any connection between the primary chamber of the master cylinder 48 and the reservoir 98 means that one single valve 118.3 can be used to perform the active mode and/or the pre-filling of the brakes (without the need for a valve 103).

Of course the various elements illustrated in the various figures of the present patent can be combined without departing from the scope of the present invention.

The invention applies notably to the automotive industry.

The invention applies mainly to the braking industry.

(2) casing
(12) ring (annular)
(3) bulkhead
(4) rotary electric motor
(8) rotor
(7) first set of ball bearings
(9) second set of ball bearings
(10) screw-nut assembly
(12) annular ring
(14) first screw thread
(16) second screw thread
(18) balls
(20) boost piston
(22) piston shank
(24) mount
(26) rear face
(28) transverse front face (of the annular ring 12)
(30) longitudinal passage
(32) plunger
(34) rear first end (of a plunger)
(35) front first end (of a control rod)
(36) control rod
(37) plunger
(38) first face (of a reaction disk)
(40) reaction disk
(42) housing
(44) second face (of a reaction disk)
(46) rear first end (of a push rod)
(47) push rod
(48) master cylinder
(49) piston
(50) front second end (of the piston)
(52) means of attachment of the plunger
(54) key
(58′) transverse ends of the key
(60) shoulder (of the rear end of the shoulder)
(65) connector
(66) means of detection
(68) elastic means
(70) force sensor
(72) actuator
(76) thrust chamber
(78) hydraulic piston
(80) line
(82) master cylinder for supplying the thrust chamber
(84) chamber
(86) piston
(88) motor
(100) command
(90) line
(92) seal
(94) electrically operated valve
(96) line
(98) reservoir
(102) electrically operated valve
(104) simulator
(106) front chamber
(108) rear chamber
(110) actuator
(112) pneumatic booster
(114) electrically operated valve
(116) pump
(118) hydraulic circuit
(120) magnet
(122) magnetic field detector
(128) elastic washer
(130) strain gauge
(132) curve P=f(F)
(134) functional clearance
(136) segment prior to saturation
(138) curve γ=f(F)
(140) deceleration saturation
(142) points
(144) curve
F=force
P=pressure
S=geometric jump
Sp=pressure jump
Sγ=deceleration jump

The invention claimed is:

1. A device for commanding braking in a motor vehicle having a member by which a driver actuates braking, the device comprising:
    a reaction device applying a reaction force;
    a first moving component driven by the member via which the driver actuates the braking;
    a second moving component having a brake boost actuator driving a force application element wherein the brake boost actuator axially moves the second moving component without moving the first moving component during rest and during braking;
    a sensor that senses a change of position of said second moving component relative to the first moving component;
    a processor configured to formulate control setpoints for commanding the brake boost actuator, in such a way as to generate a variable offset between the positions of said first and second moving components during a single braking stroke and to maintain said offset at a control setpoint both while braking and while at rest.

2. A device according to claim 1, wherein the second moving component is coupled to a reaction disk such that the first moving component and the second moving component apply force to the reaction disk during braking.

3. A device according to claim 1, wherein said offset increases a jump between the first moving component and the second moving component to cause a slower pressure increase in a master cylinder during braking.

4. A device according to claim 1, wherein the actuator comprises an electric motor.

5. A device according to claim 1, wherein the device comprises a boost piston driven by the pressure of a hydraulic fluid in a thrust chamber.

6. A device according to claim 4, further comprising: a hydraulic fluid pressure generator, the hydraulic fluid pressure generator including a variable-volume annular chamber and an annular piston which, on command, is driven by said electric motor; and connecting means for connecting the outlet of the variable-volume annular chamber to the thrust chamber.

7. A device according to claim 5, further comprising means for, on command, connecting a hydraulic fluid pressure generator to one chamber of a master cylinder.

8. A device according to claim 6, further comprising means for, on command, hermetically isolating the variable-volume chamber from the thrust chamber.

9. A device according to claim 5, further comprising means for, on command, hermetically isolating one chamber of the master cylinder from the brake fluid reservoir.

10. A device according to claim 1, wherein the processor is configured to formulate setpoints for the actuator in such a way as to cause, during braking, said offset to dynamically adjust to modify the brake boost and a jump-in.

11. A method of manufacturing a device for commanding the braking of a motor vehicle, comprising:
- manufacturing the mechanical and/or hydraulic components of said device;
- assembling the manufactured components; and
- programming a processor to allow the processor to formulate setpoints for commanding an actuator so as to cause the actuator to maintain a variable offset between a first moving component and a second moving component during a single braking stroke and to maintain said offset at a control setpoint both while braking and while at rest.

12. A device according to claim 1, wherein the member comprises a brake pedal, said brake pedal attached to the first moving component;
- wherein the first moving component comprises a control rod and a plunger;
- wherein the reaction device comprises a reaction disk that receives force both from the plunger and from a boost piston;
- wherein the second moving component comprises a pushrod that receives force from the reaction disk, wherein the pushrod delivers force to a piston of a master cylinder; and
- wherein the brake boost actuator comprises an electric motor that drives a threaded assembly such that the threaded assembly applies a translational force to the boost piston to vary the offset.

* * * * *